(12) United States Patent
Haikawa et al.

(10) Patent No.: US 11,280,525 B2
(45) Date of Patent: *Mar. 22, 2022

(54) REFRIGERATION APPARATUS

(71) Applicant: DAIKIN INDUSTRIES, LTD., Osaka (JP)

(72) Inventors: Tomoyuki Haikawa, Osaka (JP); Tomoatsu Minamida, Osaka (JP); Shigeharu Taira, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 13 days.

This patent is subject to a terminal disclaimer.

(21) Appl. No.: 17/012,868

(22) Filed: Sep. 4, 2020

(65) Prior Publication Data
US 2020/0400347 A1 Dec. 24, 2020

Related U.S. Application Data

(63) Continuation of application No. 16/089,600, filed as application No. PCT/JP2017/012619 on Mar. 28, 2017, now Pat. No. 10,794,615.

(51) Int. Cl.
*F25B 1/04* (2006.01)
*F25B 1/00* (2006.01)
*F25B 49/02* (2006.01)

(52) U.S. Cl.
CPC ............... *F25B 1/04* (2013.01); *F25B 1/00* (2013.01); *F25B 49/025* (2013.01); *F04C 2240/403* (2013.01); *F25B 2600/021* (2013.01)

(58) Field of Classification Search
CPC .. F25B 1/04; F25B 1/00; F25B 49/025; F25B 2600/21; F04C 2240/403
See application file for complete search history.

(56) References Cited

U.S. PATENT DOCUMENTS 6,581,397 B1    6/2003 Taira et al.

FOREIGN PATENT DOCUMENTS

JP        49 46243          5/1974
JP        63-286664 A      11/1988
(Continued)

OTHER PUBLICATIONS

Extended European Search Report dated Dec. 2, 2019 in corresponding European Application No. 17775075.9.
(Continued)

*Primary Examiner* — Elizabeth J Martin
*Assistant Examiner* — Nael N Babaa
(74) *Attorney, Agent, or Firm* — Birch, Stewart, Kolasch & Birch, LLP

(57) ABSTRACT

To reduce the possibility that temperature of refrigerant discharged from a compressor of a refrigeration apparatus becomes excessively high by controlling torque of a motor built into the compressor, the compressor includes the motor having rotation thereof controlled by inverter control. An inverter controller controls torque of the motor using inverter control when operation frequency of the compressor is at least one value within a range of from 10 Hz to 40 Hz. When at least the operation frequency is within the range of from 10 Hz to 40 Hz, torque of the motor is controlled, and under a predetermined condition in which temperature of refrigerant discharged from the compressor easily becomes excessively high, a device controller controls devices provided in a refrigerant circuit such that refrigerant sucked into the compressor is placed in a wet vapor state.

13 Claims, 10 Drawing Sheets

(56) References Cited

FOREIGN PATENT DOCUMENTS

| | | | |
|---|---|---|---|
| JP | 2-287062 | A | 11/1990 |
| JP | 5-10626 | A | 1/1993 |
| JP | H0675154 | A | 3/1994 |
| JP | 6-311778 | A | 11/1994 |
| JP | 2001-174075 | A | 6/2001 |
| JP | 2001-174091 | A | 6/2001 |
| JP | 2002-34276 | A | 1/2002 |
| JP | 3440910 | B2 | 8/2003 |
| JP | 2006-2732 | A | 1/2006 |
| JP | 2013-113212 | A | 6/2013 |

OTHER PUBLICATIONS

International Search Report, issued in PCT/JP2017/012619, dated Jun. 27, 2017.

REFRIGERATION APPARATUS

CROSS-REFERENCE TO RELATED APPLICATIONS

This application is a Continuation of co-pending application Ser. No. 16/089,600, filed on Sep. 28, 2018, which was filed as PCT International Application No. PCT/JP2017/012619 on Mar. 28, 2017, which claims the benefit under 35 U.S.C. § 119(a) to Patent Application No. 2016-074497, filed in Japan on Apr. 1, 2016, all of which are hereby expressly incorporated by reference into the present application.

TECHNICAL FIELD

The present invention relates to a refrigeration apparatus.

BACKGROUND ART

As disclosed in Patent Literature 1 (JP H06-311778A), a refrigeration apparatus that includes a compressor motor controlled by an inverter is known to be able to reduce vibration in a low-speed operation range of a compressor using torque control.

SUMMARY OF THE INVENTION

Technical Problem

However, performing the torque control as described in Patent Literature 1 and the like increases the current running through the compressor motor. This causes motor efficiency to decrease and more thermal energy to be generated by the compressor motor. As a result, especially in a case where the compressor motor is housed in the compressor, refrigerant compressed by the compressor is heated by the heat generated by the compressor motor. In addition, the higher the condensation temperature increases due to the outside temperature being hot, the more torque during compression fluctuates, which means that torque needs to be controlled. However, performing torque control at this time may cause a problem in that temperature of refrigerant discharged from the compressor becomes excessively hot because the refrigerant is also subject to the heat generated by torque control.

It is a problem of the present invention to reduce the possibility that temperature of refrigerant discharged from a compressor in a refrigeration apparatus becomes excessively high by controlling torque of a motor housed in the compressor.

Solution to Problem

A refrigeration apparatus according to a first aspect of the present invention is a refrigeration apparatus including a compressor that has a built-in motor having rotation thereof controlled by inverter control, the compressor that compresses refrigerant that flows through a refrigerant circuit; an inverter controller that controls torque of the motor through the inverter control when operation frequency of the compressor is at least one value within a range of from 10 Hz to 40 Hz; and a device controller that, when at least the operation frequency is within the range of from 10 Hz to 40 Hz, torque of the motor is controlled, and under a predetermined condition in which temperature of refrigerant discharged from the compressor easily becomes excessively high, control devices provided in the refrigerant circuit such that refrigerant sucked into the compressor is placed in a wet vapor state or intermediate-pressure refrigerant within the refrigerant circuit is injected into refrigerant undergoing compression in the compressor.

With the refrigeration apparatus according to the first aspect, even when the refrigerant is subject to heat generated by the motor due to torque control when the temperature of refrigerant discharged from the compressor is likely to become excessively high, the device controller can control the devices that make up the refrigerant circuit to place the refrigerant that is sucked into the refrigerant in a wet vapor state or inject intermediate-pressure refrigerant in the refrigerant circuit into refrigerant being compressed in the compressor. As a result, the temperature of refrigerant discharged from the compressor can be reduced.

A refrigeration apparatus according to a second aspect of the present invention is the refrigeration apparatus according to the first aspect of the present invention, in which the predetermined condition is one condition selected from among: a condensation temperature condition in which a condensation temperature of the refrigerant circuit is 45° C. or higher; a high-pressure condition in which pressure on a high-pressure side of the refrigerant circuit is a predetermined pressure or more; a pressure difference condition in which a difference in pressure between the high-pressure side and a low-pressure side of the refrigerant circuit is a predetermined difference or more; and an outside temperature condition in which temperature of outside air that is heat exchanged with refrigerant that flows through the refrigerant circuit is a predetermined temperature or more.

With the refrigeration apparatus according to the second aspect, it is easier to determine whether or not a predetermined condition is met because the predetermined condition is one condition selected from a condensation temperature condition, a high-pressure condition, a pressure difference condition and an outside temperature condition.

A refrigeration apparatus according to a third aspect of the present invention is the refrigeration apparatus according to the first or second aspect of the present invention, in which the refrigerant device further includes: a pressure reducing mechanism provided in the refrigerant circuit as one of the devices for reducing pressure of the refrigerant that flows through the refrigerant circuit; and an outdoor fan that is provided in the refrigerant circuit as one of the devices for supplying the outside air to be heat exchanged with the refrigerant flowing through the refrigerant circuit, the outdoor fan being configured to be able to change an amount of air sent. In the refrigeration apparatus, when at least the operation frequency is within the range of from 10 Hz to 40 Hz, torque of the motor is controlled, and under the predetermined condition, the device controller changes a degree of pressure reduction by the pressure reducing mechanism and/or controls the amount of air sent by the outdoor fan, to thereby place the refrigerant sucked into the compressor in a wet vapor state.

With the refrigeration apparatus according to the third aspect, the refrigerant sucked into the compressor is placed in a wet vapor state through changing the degree of pressure reduction by the pressure reducing mechanism and/or controlling the amount of air sent by the outdoor fan, and hence, when the operation frequency is within a range of from 10 Hz to 40 Hz, torque of the motor is controlled, and under the predetermined condition, the temperature of the refrigerant discharged from the compressor can be lowered using the pressure reducing mechanism and/or the outdoor fan, which are devices commonly used in a refrigerant circuit. As a result, there is no need to provide the refrigerant circuit with a new device for preventing the temperature of refrigerant from becoming excessively high when torque of the compressor is controlled.

A refrigeration apparatus according to a fourth aspect of the present invention is the refrigeration apparatus according to any one of the first to third aspects of the present invention, in which, when at least the operation frequency is within the range of from 10 Hz to 40 Hz, torque of the motor is controlled, and under the predetermined condition, the device controller controls the devices such that temperature of the refrigerant discharged from the compressor matches a target discharge temperature, to thereby place the refrigerant sucked into the compressor in a wet vapor state.

With the refrigeration apparatus according to the fourth aspect, the refrigerant sucked into the compressor can be placed in a wet vapor state if the temperature of refrigerant discharged from the compressor matches a target discharge temperature, and hence devices only need to be controlled while monitoring the temperature of the refrigerant discharged from the compressor.

A refrigeration apparatus according to a fifth aspect of the present invention is the refrigeration apparatus according to any one of the first to fourth aspects of the present invention, in which the refrigerant that flows through the refrigerant circuit is a refrigerant that contains more than 50 wt. % of R32.

With the refrigeration apparatus according to the fifth aspect, while it has been conventionally difficult to perform torque control when a refrigerant that contains more than 50 wt. % of R32 flows through a refrigerant circuit because the temperature of the refrigerant tends to be set relatively high, it is possible to reduce the possibility that the temperature of refrigerant becomes excessively high even when the refrigerant is subject to heat generated by a motor due to torque control.

Advantageous Effects of Invention

According to the refrigeration apparatus according to the first aspect of the present invention, it is possible to reduce the possibility that the temperature of refrigerant becomes excessively high even when torque of a compressor housing a motor is controlled.

According to the refrigeration apparatus according to the second aspect of the present invention, the device controller makes it easier to control devices.

According to the refrigeration apparatus according to the third aspect of the present invention, an increase in costs incurred for preventing the temperature of refrigerant from becoming excessively high when torque of a compressor is controlled can be reduced.

According to the refrigeration apparatus according to the fourth aspect of the present invention, it is easier to perform control using the device controller for placing the refrigerant sucked into the compressor in a wet vapor state during torque control.

According to the refrigeration apparatus according to the fifth aspect of the present invention, torque of a motor in a compressor can be easily controlled, even with a refrigerant circuit through which a refrigerant containing more than 50 wt. % of R32 flows.

DESCRIPTION OF EMBODIMENTS (1) Configuration of Air Conditioning Device

Figure 1:
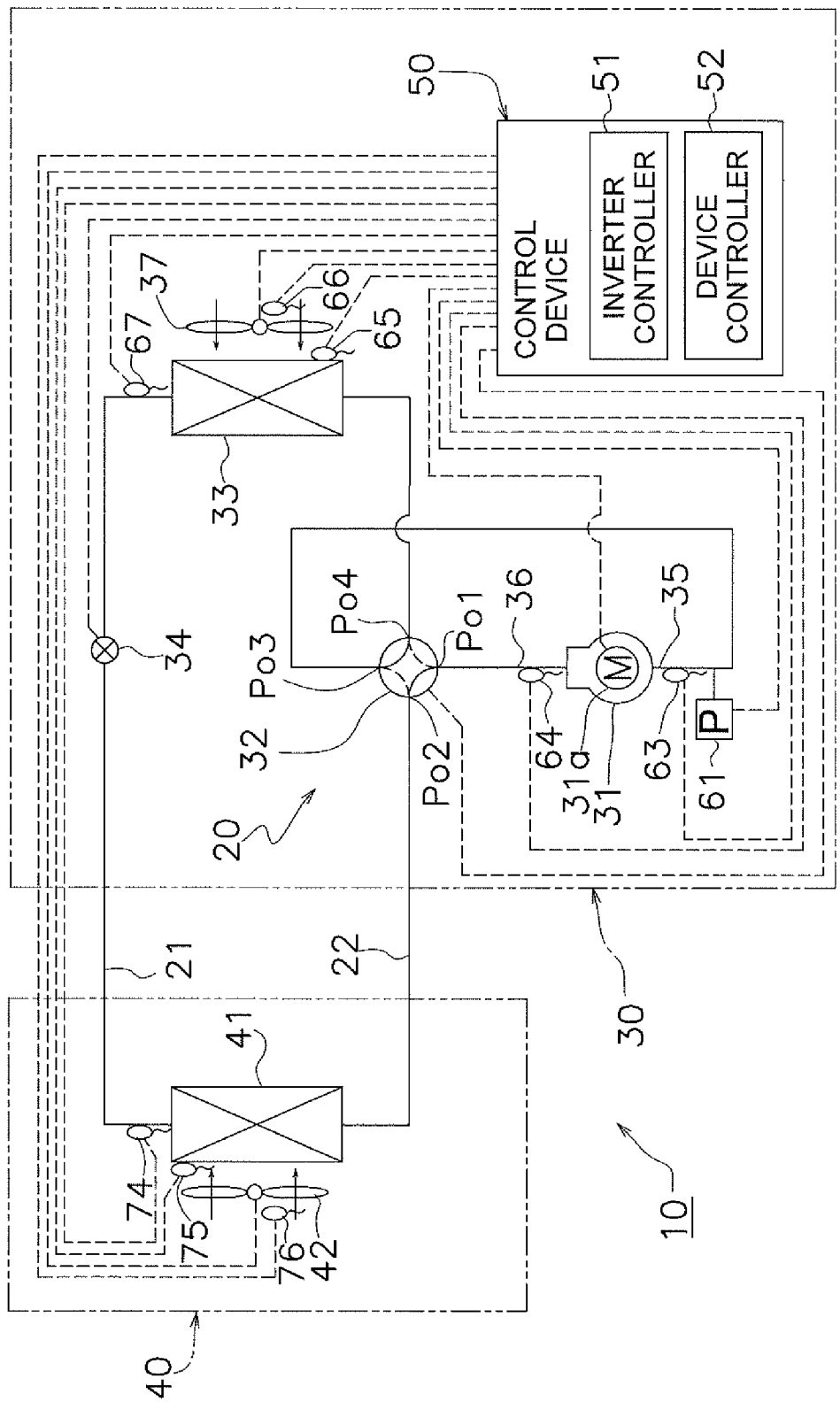
FIG. 1 is a circuit diagram for illustrating an overview of a configuration of a refrigeration apparatus according to an embodiment.

An air conditioning device as one example of a refrigeration apparatus according to one embodiment of the present invention is described with reference to FIG. 1. FIG. 1 illustrates an overview of the entire configuration of the refrigeration apparatus.

The refrigeration apparatus 10 illustrated in FIG. 1 is an air conditioning device that includes a refrigerant circuit 20 that performs a vapor-compression cooling cycle and a control device 50 used for controlling the refrigerant circuit. The refrigerant circuit 20 is formed of an outdoor unit 30 and an indoor unit 40 that are annularly connected to each other via a communication pipe 21 and a communication pipe 22. Liquid refrigerant mainly flows through the communication pipe 21 and gas refrigerant mainly flows through the communication pipe 22. In the refrigerant circuit 20, the outdoor unit 30 includes a compressor 31, a four-way valve 32, an outdoor heat exchanger 33 and a pressure reducing mechanism 34, and the indoor unit 40 includes an indoor heat exchanger 41. Refrigerant that flows through this refrigerant circuit 20 is R32 refrigerant.

(2) Detailed Configuration (2-1) Outdoor Unit

The compressor 31 housed in the outdoor unit 30 has an intake side connected to one end of an intake pipe 35 and a discharge side connected to one end of a discharge pipe 36. The other end of the discharge pipe 36, namely, the discharge side of the compressor 31 is connected to a first port Po1 of the four-way valve 32, and the other end of the intake pipe 35, namely, the intake side of the compressor 31 is connected to a third port Po3 of the four-way valve 32. The compressor 31 is configured to change operation frequency (in other words, rotational speed) of a motor 31a built into the compressor 31 according to an instruction sent from the control device 50. An inverter controller 51 of the control device 50 controls the motor 31a in the compressor 31 by inverter control. In other words, rotation of the motor 31a is controlled by inverter control. The compressor 31 is configured to change operation capacity using a change in rotational speed of the motor 31a. A change in rotational speed of the compressor 31 causes a change in the amount of refrigerant flowing through the refrigerant circuit 20.

The outdoor heat exchanger 33 housed in the outdoor unit 30 has one inlet/outlet connected to a fourth port Po4 of the four-way valve 32 and the other inlet/outlet connected to the pressure reducing mechanism 34. An outdoor fan 37 for sending outdoor air to the outdoor heat exchanger 33 is also housed in the outdoor unit 30. In the outdoor heat exchanger 33, heat is exchanged between the outdoor air sent by the outdoor fan 37 and the refrigerant that flows through the refrigerant circuit 20. A device controller 52 of the control device 50 controls rotational speed of the outdoor fan 37. The amount of air sent by the outdoor fan 37 can be changed by changing the rotational speed of the outdoor fan 37.

The pressure reducing mechanism 34 housed in the outdoor unit 30 has one end connected to the other inlet/outlet of the outdoor heat exchanger 33 and the other end connected to the communication pipe 21. The pressure reducing mechanism 34 reduces the pressure of refrigerant that flows through the refrigerant circuit 20 through restriction and expansion. The pressure reducing mechanism 34 is configured such that the opening degree of the pressure reducing mechanism 34 is adjustable according to an instruction sent from the device controller 52 of the control device 50. Therefore, the control device 50 adjusts the pressure of refrigerant and/or amount of refrigerant on a low-pressure side of the refrigerant circuit 20 by adjusting the opening degree of the pressure reducing mechanism 34. This pressure reducing mechanism 34 may be, for example, an electric expansion valve.

In the four-way valve 32 housed in the outdoor unit 30, the other end of the discharge pipe 36 is connected to the first port Po1, one inlet/outlet of the indoor heat exchanger 41 is connected to the second port Po2 via the communication pipe 22, the other end of the intake pipe 35 is connected to the third port Po3, and the one inlet/outlet of the outdoor heat exchanger 33 is connected to the fourth port Po4. The four-way valve 32 is configured such that the control device 50 can be used to switch between connection for cooling and connection for heating. During heating, as indicated by the solid lines in FIG. 1, the first port Po1 to the second port Po2 is open and the third port Po3 to the fourth port Po4 is open. On the other hand, during cooling, as indicated by the broken lines in FIG. 1, the first port Po1 to the fourth port Po4 is open, and the second port Po2 to the third port Po3 is open.

An intake pressure sensor 61 for measuring pressure of refrigerant inside the intake pipe 35 is attached to the intake pipe 35. A value of intake pressure of the compressor 31 measured by the intake pressure sensor 61 is sent to the control device 50. In addition, an intake temperature sensor 63 for measuring temperature of refrigerant in the intake pipe 35 is attached to the intake pipe 35, and a discharge temperature sensor 64 for measuring temperature of refrigerant in the discharge pipe 36 is attached to the discharge pipe 36. Values of the intake temperature and the discharge temperature of the compressor 31 measured by the intake temperature sensor 63 and the discharge temperature sensor 64 are sent to the control device 50.

An outdoor heat exchanger temperature sensor 65 for measuring temperature of refrigerant undergoing a phase change in a heat transfer tube of the outdoor heat exchanger 33, and an outdoor temperature sensor 66 for measuring the temperature of outdoor air sent to the outdoor heat exchanger 33 are attached to the outdoor heat exchanger 33. Values of temperatures measured by the outdoor heat exchanger temperature sensor 65 and the outdoor temperature sensor 66 are sent to the control device 50. Temperature of refrigerant measured by the outdoor heat exchanger temperature sensor 65 has a condensation temperature during a cooling operation and an evaporation temperature during a heating operation. In addition, an outdoor liquid-side temperature sensor 67 for measuring temperature of liquid refrigerant that passes through the other inlet/outlet of the outdoor heat exchanger 33 is attached to the other inlet/outlet of the outdoor heat exchanger 33. A value of temperature measured by the outdoor liquid-side temperature sensor 67 is sent to the control device 50.

(2-2) Indoor Unit

The indoor heat exchanger 41 housed in the indoor unit 40 has one inlet/outlet connected to the second port Po2 of the four-way valve 32 via the communication pipe 22 and the other inlet/outlet connected to the communication pipe 21. An indoor fan 42 for sending indoor air to the indoor heat exchanger 41 is housed in the indoor unit 40. In the indoor heat exchanger 41, heat is exchanged between indoor air sent by the indoor fan 42 and refrigerant that flows through the refrigerant circuit 20. Rotational speed of the indoor fan 42 is controlled by the device controller 52 of the control device 50. The amount of air sent by the indoor fan 42 can be changed by changing the rotational speed of the indoor fan 42.

An indoor liquid-side temperature sensor 74 for measuring temperature of liquid refrigerant that passes through the other inlet/outlet of the indoor heat exchanger 41 is attached to the other inlet/outlet of the indoor heat exchanger 41. A value of temperature measured by the indoor liquid-side temperature sensor 74 is sent to the control device 50.

An indoor heat exchanger temperature sensor 75 for measuring temperature of refrigerant undergoing a phase change inside a heat transfer pipe of the indoor heat exchanger 41 and an indoor temperature sensor 76 for measuring temperature of indoor air sent to the indoor heat exchanger 41 are attached to the indoor heat exchanger 41. Values of temperatures measured by the indoor heat exchanger temperature sensor 75 and the indoor temperature sensor 76 are sent to the control device 50. Temperature of refrigerant measured by the indoor heat exchanger temperature sensor 75 has a condensation temperature during a heating operation and an evaporation temperature during a cooling operation.

(3) Operation of Refrigeration Apparatus 10

(3-1) Outline of Operation

In the refrigeration apparatus 10, refrigerant circulates through the refrigerant circuit 20 which includes the compressor 31, the outdoor heat exchanger 33, the pressure reducing mechanism 34 and the indoor heat exchanger 41. The refrigerant circuit 20 performs a vapor-compression refrigeration cycle. More specifically, during a cooling operation, gas refrigerant that is compressed and discharged from the compressor 31 is sent to the outdoor heat exchanger 33 by way of the four-way valve 32. In the outdoor heat exchanger 33 of the outdoor unit 30, high-temperature and high-pressure refrigerant exchanges heat with outdoor air such that condensation heat is released from the high-pressure gas refrigerant and the refrigerant turns to liquid. The cooled refrigerant that has released heat outdoors is reduced in pressure using the pressure reducing mechanism 34 until the refrigerant can evaporate easily even at low temperature. This low-pressure refrigerant then flows into the indoor heat exchanger 41 of the indoor unit 40 and is made to exchange heat with indoor air by the indoor heat exchanger 41 such that low-pressure liquid refrigerant removes heat from the indoor air by removing evaporation heat. The refrigerant that has been cooled by the indoor heat exchanger 41 and turned to a gas (or undergone a phase change) is sucked into the compressor 31 via the four-way valve 32.

During a heating operation, opposite to the cooling operation, gas refrigerant that is compressed and discharged from the compressor 31 is sent to the indoor heat exchanger 41 by way of the four-way valve 32. In the indoor heat exchanger 41, high-temperature and high-pressure gas refrigerant exchanges heat with indoor air such that condensation heat is released from the high-pressure gas refrigerant and the refrigerant turns to liquid. The cooled refrigerant that has released heat indoors is reduced in pressure using the pressure reducing mechanism 34 until the refrigerant can evaporate easily even at low temperature. The low-pressure refrigerant is then made to exchange heat with outdoor air by the outdoor heat exchanger 33 such that evaporation heat is removed from the low-pressure liquid refrigerant. The refrigerant that has been cooled by the outdoor heat exchanger 33 and turned to a gas (or undergone a phase change) is sucked into the compressor 31 via the four-way valve 32.

Figure 2:
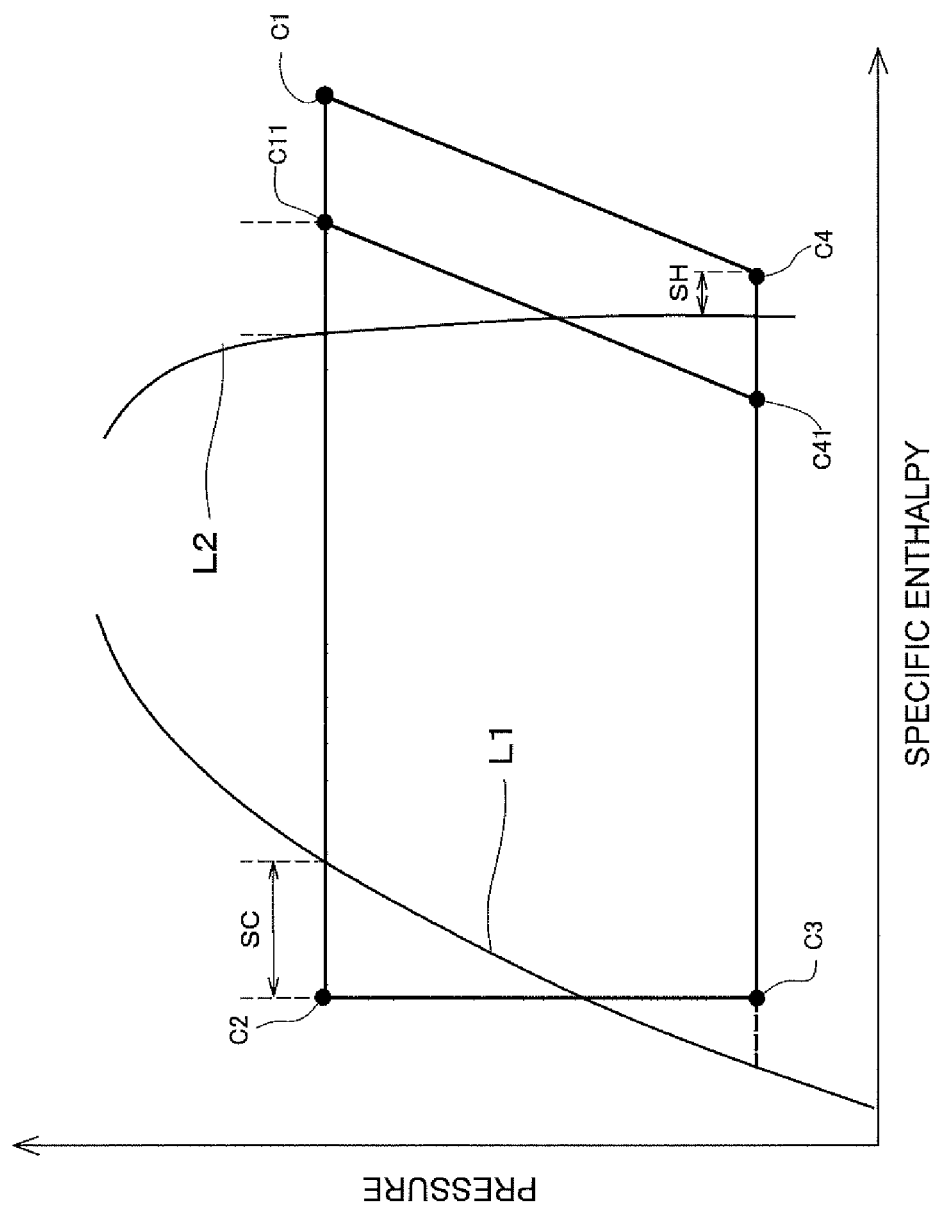
FIG. 2 is a Mollier diagram for explaining operation of the refrigeration apparatus in FIG. 1.

This vapor-compression refrigeration cycle is illustrated in FIG. 2. In FIG. 2, the curved line L1 represents saturated liquid and the curved line L2 represents dry saturated vapor. In FIG. 2, states of the points C1 and C11 correspond to states of the refrigerant on the discharge-side of the compressor 31, that is, in the discharge pipe 36. In other words, the states of the points C1 and C11 correspond to states of refrigerant in a condenser, that is, an inlet of the indoor heat exchanger 41 during a heating operation or an inlet of the outdoor heat exchanger 33 during a cooling operation. The state of the next point C2 corresponds to a state at an outlet of the condenser and to a state at an inlet of the pressure reducing mechanism 34. Refrigerant at the outlet of the condenser has a degree of subcooling SC. The state of the next point C3 corresponds to a state at an outlet of the pressure reducing mechanism 34. In other words, the state of the point C3 corresponds to states in an evaporator, that is, an inlet of the indoor heat exchanger 41 during a cooling operation or an inlet of the outdoor heat exchanger 33 during a heating operation. The states of the points C4 and C41 correspond to states at an intake-side of the compressor 31, that is, the intake pipe 35.

(3-2) Control Based on Discharge Temperature of Compressor 31

In the refrigeration apparatus 10, control is performed on the basis of a discharge temperature of the compressor 31. The control device 50 acquires the temperature of refrigerant on the discharge side of the compressor 31 from the discharge temperature sensor 64, acquires the temperature of refrigerant inside the outdoor heat exchanger 33 from the outdoor heat exchanger temperature sensor 65, and acquires the temperature of refrigerant inside the indoor heat exchanger 41 from the indoor heat exchanger temperature sensor 75. During a cooling operation, the temperature measured by the outdoor heat exchanger temperature sensor 65 is used as a condensation temperature TC and the temperature measured by the indoor heat exchanger temperature sensor 75 is used as an evaporation temperature TE. During a heating operation, the temperature measured by the outdoor heat exchanger temperature sensor 65 is used as the evaporation temperature TE and the temperature measured by the indoor heat exchanger temperature sensor 75 is used as the condensation temperature TC.

The control device 50 uses data stored therein to determine a target discharge temperature TTd. Then, the control device 50 adjusts the opening degree of the pressure reducing mechanism 34 such that the temperature of the refrigerant on the discharge side of the compressor 31 measured by the discharge temperature sensor 64 becomes the target discharge temperature TTd. To achieve this, the control device 50 compares the discharge temperature of the compressor 31 and the target discharge temperature TTd. If the value measured by the discharge temperature sensor 64 is smaller than the target discharge temperature TTd, the control device 50 decreases the opening degree of the pressure reducing mechanism 34. On the other hand, if the value measured by the discharge temperature sensor 64 is larger than the target discharge temperature TTd, the control device 50 increases the opening degree of the pressure reducing mechanism 34 and controls the temperature of the refrigerant on the discharge side of the compressor 31 in a decreasing direction.

(3-3) Torque Control by Compressor 31

When the compressor 31 is a rotary compressor and the compressor 31 has one cylinder, in particular, the compressor 31 is more likely to vibrate. As a solution to this problem, there is described herein a case in which the compressor 31 is a one-cylinder rotary compressor that only has one roller that rotates eccentrically. When operation frequency of the compressor 31 is low, in particular, when the operation frequency is within a range of from 10 Hz to 40 Hz, for example, the compressor 31 is more likely to vibrate. This tendency to vibrate is often seen in a one-cylinder compressor 31. In the outdoor unit 30, because the intake pipe 35 and the discharge pipe 36 are connected to the compressor 31, vibration of the compressor 31 is transmitted to the intake pipe 35 and the discharge pipe 36 and propagated outward of the outdoor unit 30, thereby causing noise.

Figure 3:
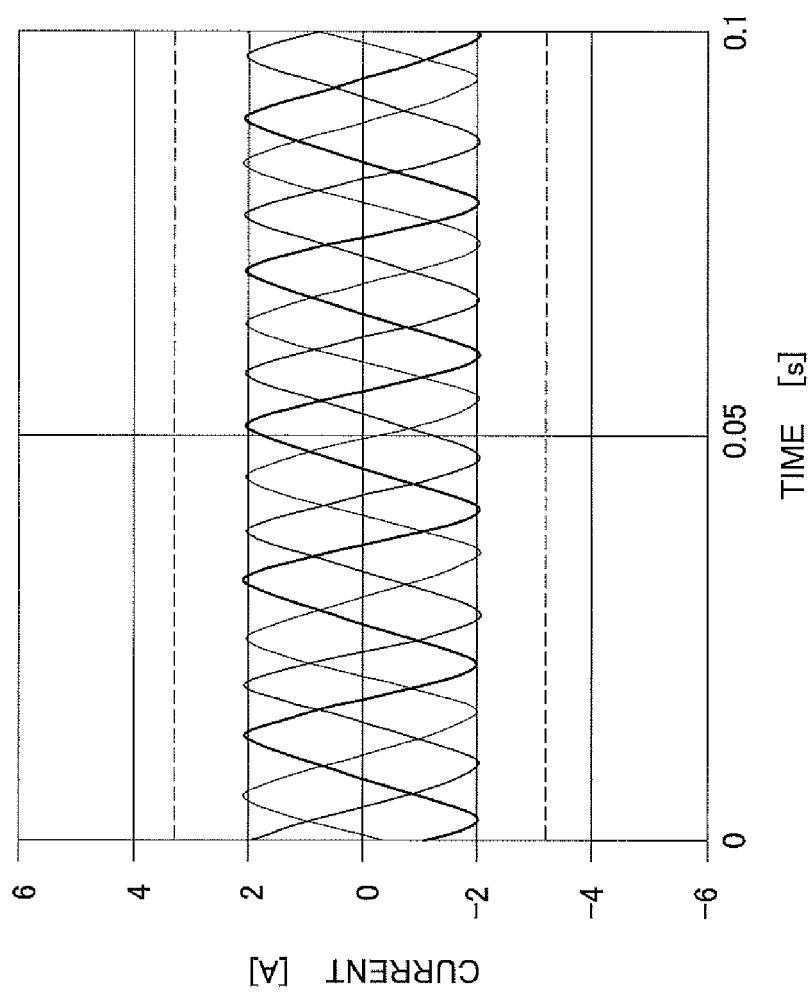
FIG. 3 is a waveform graph for showing an exemplary waveform of a current supplied to a motor of a compressor when torque is not controlled.
Figure 4:
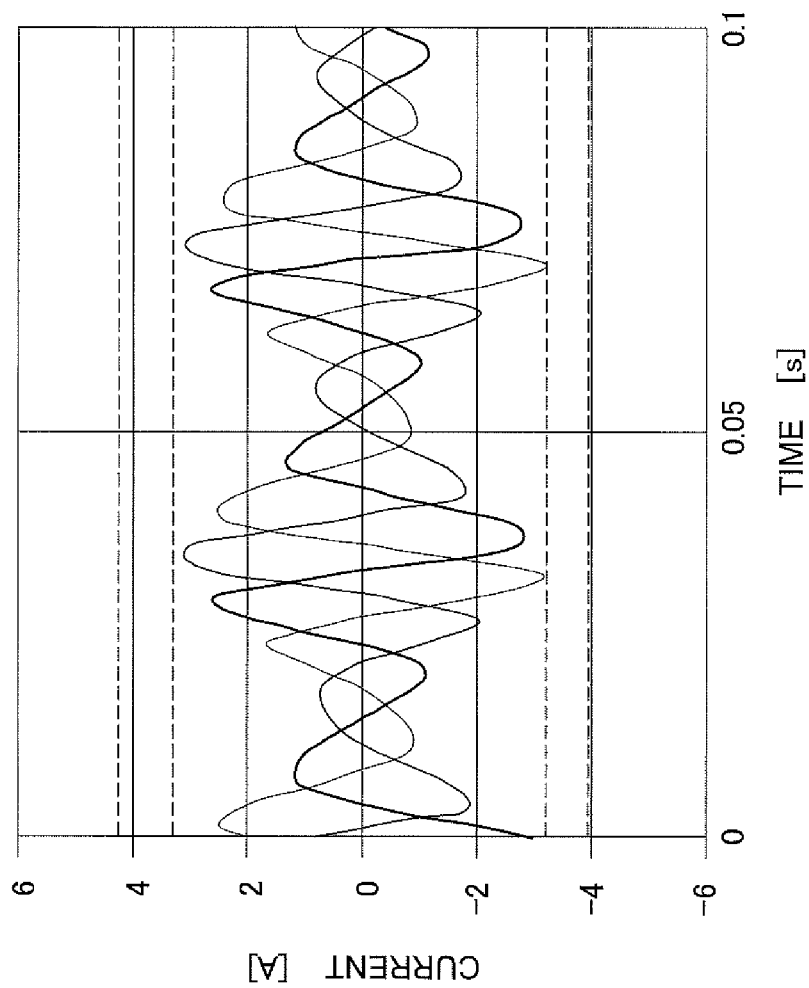
FIG. 4 is a waveform graph for showing an exemplary waveform of a current supplied to the motor of the compressor when torque is controlled.
Figure 5:
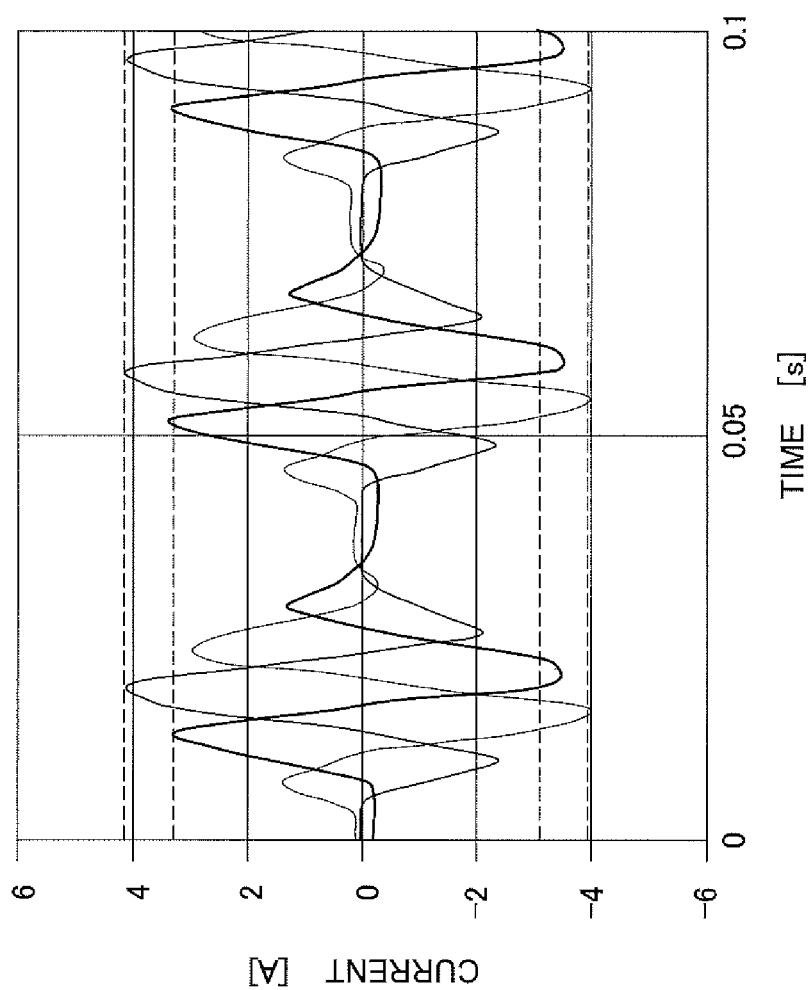
FIG. 5 is a waveform graph for showing another exemplary waveform of a current supplied to the motor of the compressor when torque is controlled.

In order to reduce vibration in the compressor 31, the inverter controller 51 of the control device 50 controls torque of the compressor 31 within a predetermined range that includes operation frequency of from 10 Hz to 40 Hz. FIGS. 3, 4 and 5 illustrate waveforms of currents supplied to the motor 31a that is inverter controlled. The current supplied to the motor 31a is three-phase current. FIG. 3 shows a current waveform when torque is not controlled. FIG. 4 shows a current waveform when a torque control amount is approximately 60%. FIG. 5 shows a current waveform when torque control is 100%. The phrase "torque control is 100%" refers to applying the maximum torque control allowed for this compressor 31. Comparing the current waveform of FIG. 3 to the current waveforms of FIGS. 4 and 5 makes it clear that the current waveform becomes more distorted as the torque control amount increases.

Figure 6:
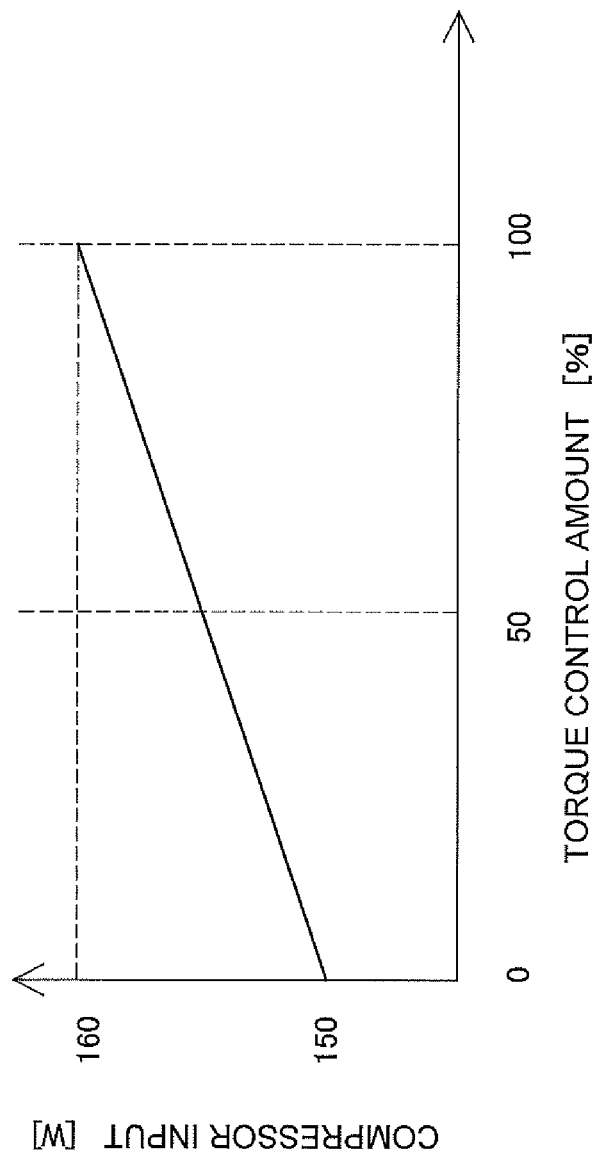
FIG. 6 is a graph for showing a relationship between a torque control amount and power input to the compressor.
Figure 7:
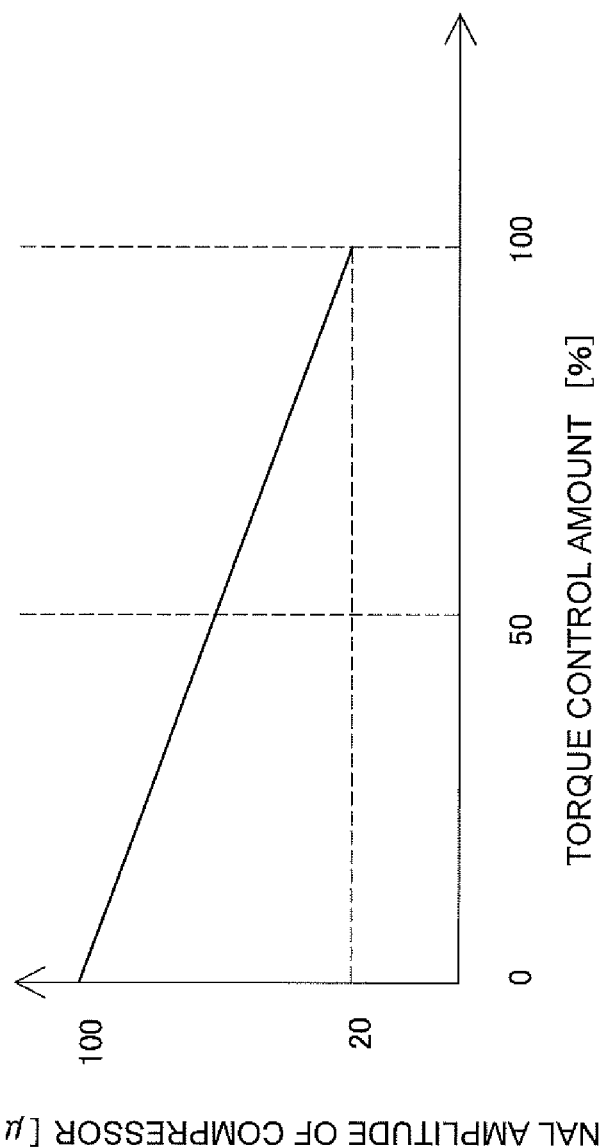
FIG. 7 is a graph for showing a relationship between a torque control amount and vibration of the compressor.
Figure 8:
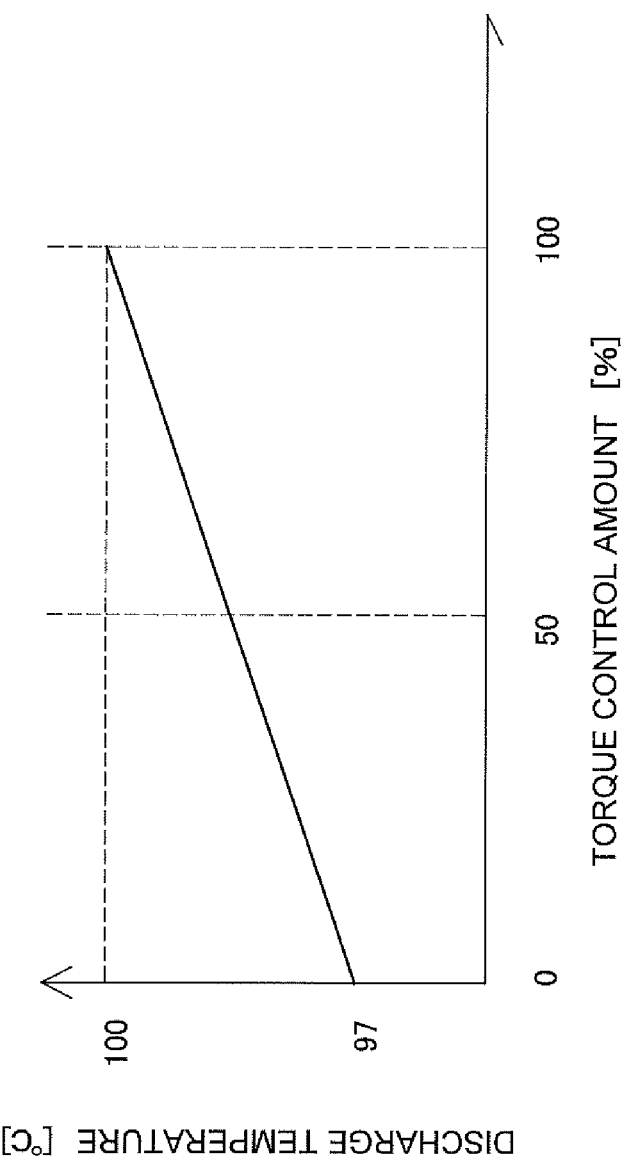
FIG. 8 is a graph for showing a relationship between a torque control amount and temperature of refrigerant discharged from the compressor.

In order to examine this phenomenon from another aspect, FIG. 6 shows the relationship between a torque control amount and power input to the compressor 31, FIG. 7 shows the relationship between a torque control amount and degree of vibration of the compressor 31, and FIG. 8 shows the relationship between a torque control amount and the discharge temperature of the compressor 31. In FIGS. 6 to 8, no parameters other than the torque control amount are changed. As illustrated in FIG. 6, the power input to the compressor 31 is 150 W when no torque control is applied and increases to 160 W when the torque control amount is 100%. This can clearly be seen from the above-described current waveforms, and is due to the current waveform becoming more distorted as the torque control amount increases, in other words, loss increasing as the torque control amount increases.

Although loss increases when the torque control amount is increased, vibration of the compressor 31 is reduced as illustrated in FIG. 7. However, as illustrated in FIG. 8, the motor 31a generates heat when loss increases due to an increase in the torque control amount. Because the motor 31a is built into the compressor 31, the heat generated by the motor 31a inside the compressor 31 is transferred to the refrigerant discharged from the compressor 31, and this causes the temperature of the refrigerant discharged from the compressor 31 to increase. When efficiency of the refrigeration apparatus 10 decreases by some percent due to, for example, torque control, the temperature of the refrigerant discharged from the compressor 31 increases by approximately 1 to 5° C.

Now, a case in which torque control is applied when operation frequency is a value within the range of from 10 Hz to 40 Hz, for example, 40 Hz is described. Even if heat is generated due to loss caused by torque control as described above, the refrigeration apparatus 10 continues to run similarly to a conventional refrigeration apparatus if the temperature of the refrigerant discharged from the compressor 31 does not become excessively high.

However, if the temperature of the refrigerant discharged from the compressor 31 becomes too high because of the heat generated by torque control, the device controller 52 of the control device 50 controls the devices set in the refrigerant circuit 20 such that the refrigerant taken into the compressor 31 is placed in a wet vapor state. When the refrigerant circuit 20 is configured to perform the refrigeration cycle as illustrated in FIG. 2, the refrigerant sucked into the compressor 31 is in the state of the point C4 and is dry and not wet when the target discharge temperature TTd is, for example, in the state of the point C1. In other words, the refrigerant discharged from the compressor 31 has a degree of superheating SH. If the target discharge temperature TTd is in the state of the point C11, the refrigerant sucked into the compressor 31 is in the state of the point C41 and is wet. More specifically, in order for the refrigeration cycle to be configured such that the state changes from the point C41 to the point C11, the refrigerant sucked into the compressor 31 is placed in a wet vapor state (state of point C41) through changing a degree of pressure reduction by the pressure reducing mechanism 34. How to set the target discharge temperature TTd so that the refrigerant taken into the compressor 31 is placed into the wet vapor state is investigated beforehand by, for example, an experiment using a real machine and/or a simulation. Depending on the result of the examination, the control device 50 may be set so as to perform control of changing the target discharge temperature TTd or set so as to maintain the discharge temperature TTd with no change.

One condition under which the temperature of the refrigerant discharged from the compressor 31 easily becomes excessively high is, for example, a case in which the outdoor temperature of the place in which the outdoor unit 30 is disposed has a high temperature. Here, "high temperature" refers to a temperature of 35° C. or higher. In a refrigeration apparatus 10 that operates at a high outdoor temperature, the condensation temperature of the refrigerant circuit 20 is likely to increase, and the temperature of the refrigerant discharged from the compressor 31 is likely to excessively increase. Therefore, the control device 50 of the refrigeration apparatus 10 determines that the refrigeration apparatus 10 is under a condition in which the temperature of the refrigerant discharged from the compressor 31 easily becomes excessive according to whether or not the condensation temperature satisfies a condensation temperature condition, such as being 45° C. or higher.

In other words, when the operation frequency is a value within the range of from 10 Hz to 40 Hz, torque of the motor 31a is controlled using inverter control, and the condensation temperature satisfies a condensation temperature condition of being 45° C. or higher, the device controller 52 of the control device 50 changes the degree of pressure reduction by the pressure reducing mechanism 34 such that, for example, the refrigerant sucked into the compressor 31 is placed in the state of the point C41 in FIG. 2 in a wet vapor state. When this condition is satisfied, the opening degree of the pressure reducing mechanism 34 is increased at a timing when, for example, the torque control is started.

(4) Modification Examples

An embodiment of the present invention is described above, but the specific configuration of the present invention may be changed without departing from the gist of the present invention. Modification examples that can be applied to the embodiment of the present invention are described below.

(4-1) Modification Example A

Figure 9:
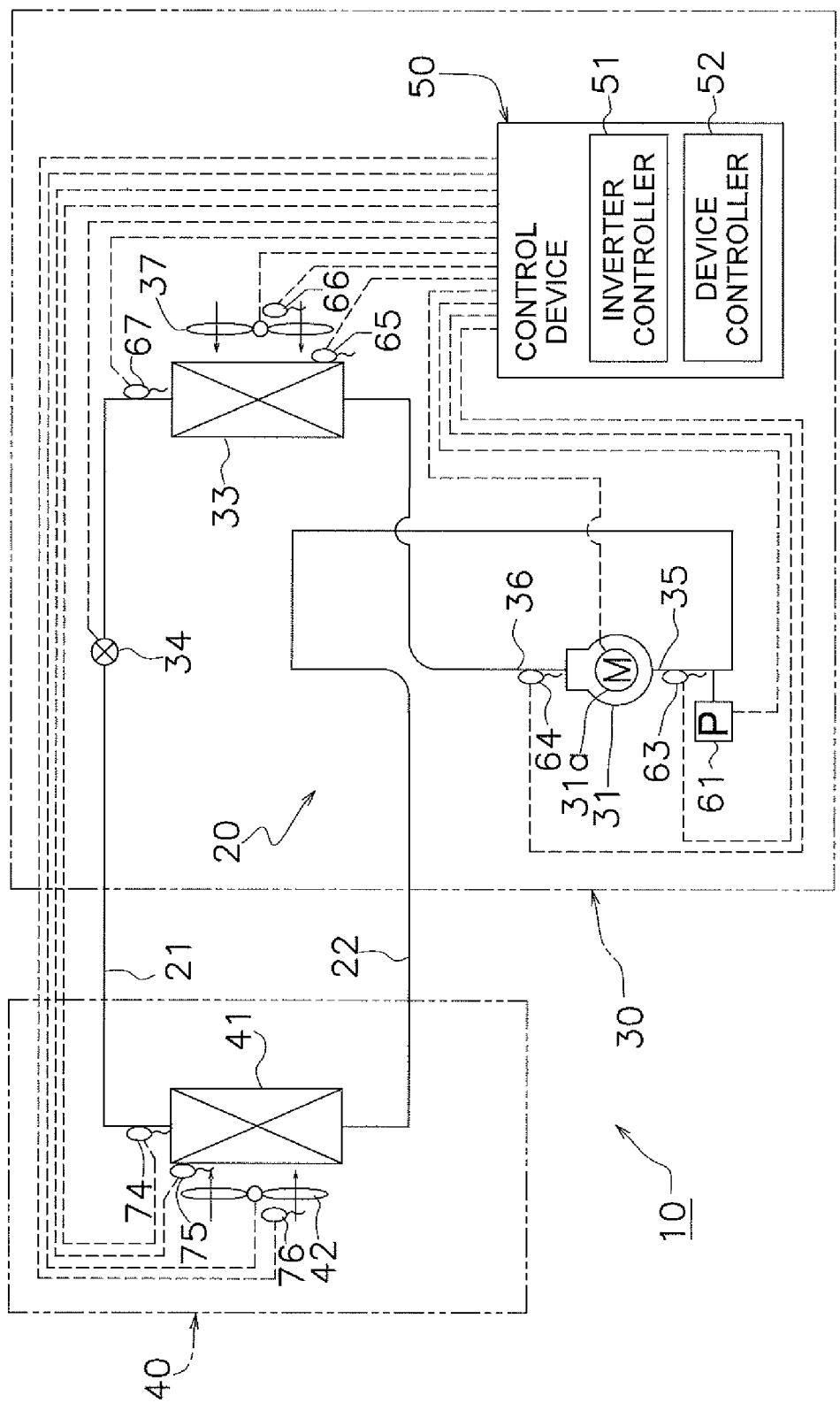
FIG. 9 is a circuit diagram for illustrating an overview of a configuration of a refrigeration apparatus according to a modification example A.

In the above-mentioned embodiment, the refrigeration apparatus 10 is described as being an air conditioning device that can perform both cooling and heating, but the refrigeration apparatus 10 may be a cooling-only device as illustrated in FIG. 9. The refrigeration apparatus 10 illustrated in FIG. 9 is a device in which the four-way valve 32 of the refrigeration apparatus 10 illustrated in FIG. 1 is removed, the other end of the discharge pipe 36 is connected to the one inlet/outlet of the outdoor heat exchanger 33, and the other end of the intake pipe 35 is connected to the communication pipe 22.

(4-2) Modification Example B

In the above-described embodiment, the refrigerant sucked into the compressor 31 is placed in a wet vapor state through changing the degree of pressure reduction by the pressure reducing mechanism 34 that uses an electrical expansion valve, but a pressure reducing mechanism other than an electric expansion valve can be used for the pressure reducing mechanism 34. For example, a mechanical expansion valve that uses a diaphragm or a capillary tube can be used. This valve or tube can be configured to, for example, change the degree of pressure reduction when the mechanism expansion valve or the capillary tube is used with a solenoid valve.

The device controller 52 of the control device 50 may be configured to perform control such that the refrigerant sucked into the compressor 31 is placed in a wet vapor state by changing the amount of air sent by the outdoor fan 37 instead of the degree of pressure reduction by the pressure reducing mechanism 34. For example, during a cooling operation, the degree of subcooling SC in the outdoor heat exchanger 33 easily increases and the refrigerant sucked into the compressor 31 is easily placed in a wet vapor state when the amount of air sent by the outdoor fan 37 is increased, compared to a case in which the amount of sent air is small. In addition, the device controller 52 may be configured such that the refrigerant sucked into the compressor 31 is placed in a wet vapor state through changing both the degree of pressure reduction by the pressure reducing mechanism 34 and the amount of air sent by the outdoor fan 37.

(4-3) Modification Example C

In the above-described embodiment or the modification example B, there is described a case in which the pressure reducing mechanism 34 and/or the outdoor fan 37 are controlled as devices of the refrigerant circuit 20 in order to lower the temperature of the refrigerant discharged from the compressor 31, but the present invention may be configured such that another device is used to place the refrigerant sucked into the compressor 31 in a wet vapor state or such that intermediate pressure refrigerant in the refrigerant circuit 20 is injected into refrigerant being compressed in the compressor 31.

Figure 10:
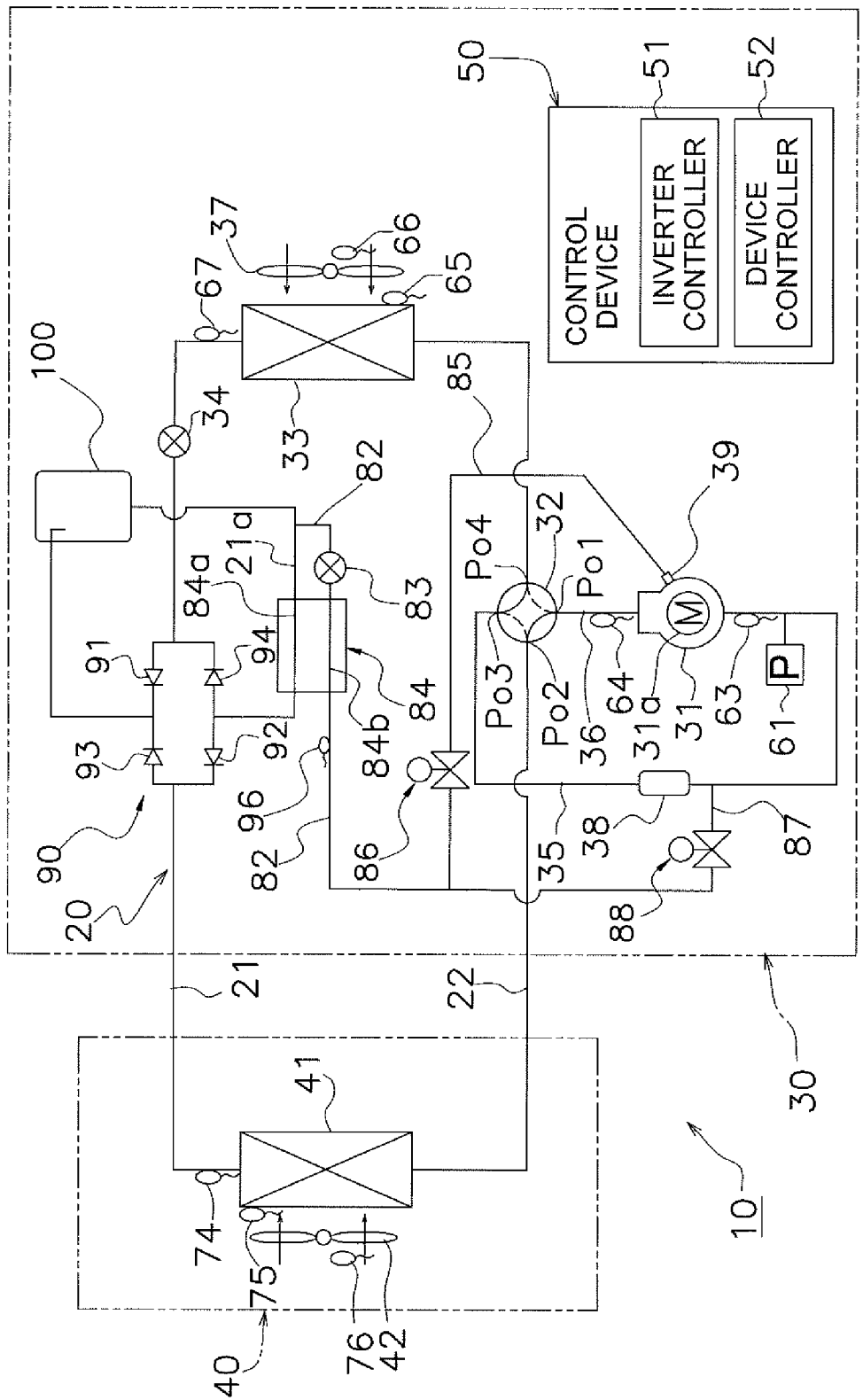
FIG. 10 is a circuit diagram for illustrating an overview of a configuration of a refrigeration apparatus according to a modification example C.

FIG. 10 illustrates an exemplary refrigeration apparatus 10 that has a configuration in which the temperature of the refrigerant discharged from the compressor 31 is lowered through injection. The refrigeration apparatus 10 illustrated in FIG. 10 includes a bridge circuit 90, a high-pressure receiver 100, an electronic valve for injection 83, a heat exchanger for injection 84, an intermediate injection open/close valve 86 and an intake injection open/close valve 88. The compressor 31 takes in gas refrigerant from the intake pipe 35 via a compressor container 38. The other end of the pressure reducing mechanism 34 is connected to the bridge circuit 90.

The bridge circuit 90 has four check valves 91, 92, 93, 94. The inlet check valve 91 is a check valve that only allows refrigerant to flow from the outdoor heat exchanger 33 to the high-pressure receiver 100. The outlet check valve 92 is a check valve that only allows refrigerant to flow from the high-pressure receiver 100 to the indoor heat exchanger 41. The inlet check valve 93 is a check valve that only allows refrigerant to flow from the indoor heat exchanger 41 to the high-pressure receiver 100. The outlet check valve 94 is a check valve that only allows refrigerant to flow from the high-pressure receiver 100 to the outdoor heat exchanger 33 via the pressure reducing mechanism 34. In other words, the inlet check valves 91, 93 perform a function of causing refrigerant to flow from one of the outdoor heat exchanger 33 and the indoor heat exchanger 41 to the high-pressure receiver 100, and the outlet check valves 92, 94 perform a function of causing refrigerant to flow from the high-pressure receiver 100 to the other one of the outdoor heat exchanger 33 and the indoor heat exchanger 41. The high-pressure receiver 100 is a container that functions as a refrigerant storage tank and is provided between the pressure reducing mechanism 34 and the indoor unit 40.

The heat exchanger for injection 84 is provided between an outlet of the high-pressure receiver 100 and the outlet check valves 92, 94 of the bridge circuit 90. A branched pipe 82 branches off from one part of a main refrigerant flow passage 21a that connects an outlet of the high-pressure receiver 100 to the heat exchanger for injection 84. The main refrigerant flow passage 21a is a main flow passage for liquid refrigerant that connects the outdoor heat exchanger 33 to the indoor heat exchanger 41.

The electronic valve for injection 83 is provided in the branched pipe 82. The opening degree of the electronic valve for injection 83 can be adjusted. The branched pipe 82 is connected to a second flow passage 84b of the heat exchanger for injection 84. In other words, when the electronic valve for injection 83 is open, refrigerant that has branched off from the main refrigerant flow passage 21a into the branched pipe 82 is reduced in pressure by the electronic valve for injection 83 and flows into the second flow passage 84b of the heat exchanger for injection 84. The second flow passage 84b of the heat exchanger for injection 84 forms a part of the branched pipe 82.

The refrigerant that has been reduced in pressure by the electronic valve for injection 83 and flown into the second flow passage 84b of the heat exchanger for injection 84 exchanges heat with refrigerant that flows through the first flow passage 84a of the heat exchanger for injection 84. The first flow passage 84a of the heat exchanger for injection 84 forms a part of the main refrigerant flow passage 21a. After heat exchange by the heat exchanger for injection 84, the refrigerant that flows through the branched pipe 82 flows into an intermediate injection flow passage 85 or an intake injection flow passage 87 to be described later. A temperature sensor for injection 96 for detecting temperature of the refrigerant after heat exchange by the heat exchanger for injection 84 is attached to a downstream side of the heat exchanger for injection 84 of the branched pipe 82.

The heat exchanger for injection 84 is, for example, an internal heat exchanger with a double-pipe structure and, as described above, causes heat exchange between refrigerant that flows through the main refrigerant flow passage 21a which is a main flow passage and refrigerant for injection that flows through the branched pipe 82 that branches off from the main refrigerant flow passage 21a used for injection. The first flow passage 84a of the heat exchanger for injection 84 has one end connected to an outlet of the high-pressure receiver 100 and the other end connected to the outlet check valves 92, 94 of the bridge circuit 90.

The compressor container 38 is disposed in the intake pipe 35 between the four-way valve 32 and the compressor 31 and serves to avoid the compressor 31 from taking in a large amount of liquid refrigerant when a refrigerant that transiently contains many liquid components flows into the intake pipe 35. In addition to the compressor container 38 described in this modification example, the intake pipe 35 may be provided with an accumulator for reducing liquid that flows back into the compressor 31.

The intake injection flow passage 87 is connected to a pipe of the intake pipe 35 that connects the compressor container 38 to the compressor 31. The intake injection flow passage 87 is a pipe that connects a downstream portion of the heat exchanger for injection 84 of the branched pipe 82 to the intake pipe 35. The intake injection open/close valve 88 is provided in the intake injection flow passage 87. The intake injection open/close valve 88 is a solenoid valve that switches between an open state and a closed state.

The compressor 31 is provided with an intermediate injection port 39. The intermediate injection port 39 is a refrigerant introduction port for causing outside refrigerant to flow into intermediate-pressure refrigerant that is being compressed by the compressor 31. The intermediate injection flow passage 85 is connected to the intermediate injection port 39. The intermediate injection flow passage 85 is a pipe that connects the downstream portion of the heat exchanger for injection 84 of the branched pipe 82 to the intake pipe 35 to the intermediate injection port 39. The intermediate injection open/close valve 86 is provided in the intermediate injection flow passage 85. The intermediate injection open/close valve 86 is a solenoid valve that switches between an open state and a closed state. The compressor 31 may have a configuration in which the intermediate injection flow passage 85 is connected to a refrigerant pipe that connects a discharge port of a low-stage compressor to an intake port of a high-stage compressor in place of a configuration in which two compressors are provided in series.

As illustrated in FIG. 10, a tip of the branched pipe 82 that extends through the heat exchanger for injection 84 to the compressor 31 is connected to the intermediate injection flow passage 85 and the intake injection flow passage 87 via a forked pipe. When the intermediate injection open/close valve 86 is open, refrigerant that flows through the branched pipe 82 via the heat exchanger for injection 84 is injected into the intermediate injection port 39 from the intermediate injection flow passage 85. When the intake injection open/close valve 86 is closed, refrigerant that flows through the branched pipe 82 is injected into the intake pipe 35 from the intake injection flow passage 87 and sucked into the compressor 31. In FIG. 10, broken lines that indicate the connection relationships between the various devices of the control device 50 and the refrigerant circuit 20 are not shown.

Next, operation of the refrigeration apparatus 10 according to this modification example is described. Control in each type of operation described herein is performed by the functioning control device 50. The control device 50 aims to increase operation performance and lower the discharge temperature of the compressor 31. The device controller 52 of the control device 50 performs either intermediate injection or intake injection when the operation frequency is one value between the range of from 10 Hz to 40 Hz, torque of the motor 31a is controlled using inverter control, and the condensation temperature satisfies a condensation temperature condition of being 45° C. or higher. The intermediate injection refers to partly dividing refrigerant that flows through the main refrigerant flow passage 21a from the condenser to the evaporator and injecting refrigerant gas into the intermediate injection port 39 of the compressor 31 through the intermediate injection flow passage 85. The intake injection refers to partly dividing refrigerant that flows through the main refrigerant flow passage 21a from the condenser to the evaporator and injecting refrigerant gas into the intake pipe 35 through the intake injection flow passage 87 so that the refrigerant gas is sucked into the compressor 31. Both of the intermediate injection and the intake injection achieve an effect of lowering the discharge temperature of the compressor 31.

In the intermediate injection control, the intermediate injection open/close valve 86 is open and the intake injection open/close valve 88 is closed. The opening degree of the electronic valve for injection 83 is controlled on the basis of the discharge temperature of refrigerant discharged from the compressor 31, and wet control of wetting intermediately injected gas refrigerant is performed. In other words, the control device 50 controls the opening degree of the electronic valve for injection 83 such that intermediately injected gas refrigerant changes to two-phase gas-liquid flash gas in order to increase the cooling effect of intermediate injection.

When neither of the intermediate injection nor the intake injection are performed, both the intermediate injection open/close valve 86 and the intake injection open/close valve 88 are closed.

In the intake injection control, the intermediate injection open/close valve 86 is closed and the intake injection open/close valve 88 is open. The opening degree of the electronic valve for injection 83 is controlled, and wet control of wetting intake injected gas refrigerant is performed. In other words, the control device 50 controls the opening degree of the electronic valve for injection 83 such that the intake injected gas refrigerant changes to two-phase gas-liquid flash gas in order to increase the cooling effect of intake injection.

(4-4) Modification Example D

In the above-described embodiment and the modification examples A to C, the condensation temperature condition in which the condensation temperature of the refrigerant circuit 20 is 45° C. or higher is set as a predetermined condition for determining whether or not the device controller 52 is to control the devices disposed in the refrigerant circuit 20 such that the refrigerant sucked into the compressor 31 is placed in a wet vapor state or such that the intermediate-pressure refrigerant in the refrigerant circuit 20 is injected into the refrigerant undergoing compression in the compressor 31. However, instead of the condensation temperature condition, this predetermined condition may be one of a high-pressure condition in which pressure on a high-pressure side of the refrigerant circuit 20 is a predetermined pressure or higher, a pressure difference condition in which a difference in pressure between the high-pressure side and a low-pressure side of the refrigerant circuit 20 is a predetermined difference or more, or an outside temperature condition in which the temperature of outside air that exchanges heat with the refrigerant that flows through the refrigerant circuit 20 is a predetermined temperature or more. The high-pressure condition is determined to be satisfied/unsatisfied by the control device 50 depending on if, for example, pressure of refrigerant detected by a pressure sensor provided in the discharge pipe 36 is a predetermined pressure or more. The pressure difference condition is determined to be satisfied/unsatisfied by the control device 50 through, for example, calculating pressure of the high-pressure side of the refrigerant circuit 20 from a difference in pressure of refrigerant detected by a pressure sensor provided in the discharge pipe 36 and pressure of intake pressure sensor 61 and determining whether that calculated difference in pressure is a predetermined difference or more. The outside temperature condition is determined to be satisfied/unsatisfied by the control device 50 depending on if, for example, the temperature of outside air detected by the outside temperature sensor 66 is a predetermined temperature or more.

(4-5) Modification Example E

In the above-described embodiment and the modification examples A to D, a case is described in which an HFC refrigerant that is a simple R32 refrigerant represented by the molecular formula $CH_2F_2$ flows through the refrigerant circuit 20, but the refrigerant that flows through the refrigerant circuit 20 is not limited to the HFC refrigerant that is a simple R32 refrigerant. However, the refrigerant that flows through the refrigerant circuit 20 is preferably a refrigerant that contains more than 50 wt. % of R32. A refrigerant that contains more than 50 wt. % of R32 is, for example, a mixture between R32 and HFO-1234yf, or a mixture between R32 and HFO-1123. A refrigerant that contains more than 50 wt. % of R32 and does not contain chlorine contributes less to global warming and breaking down the ozone layer compared to other fluorocarbon refrigerants such as chlorofluorocarbons and hydrochlorofluorocarbons, and further achieves relatively high efficiency in the refrigeration apparatus 10. Examples of other refrigerants include $CO_2$, HFO-1234yf and HFO-1123.

(5) Characteristics (5-1)

As described above, in the refrigeration apparatus 10, even if the motor generates heat due to torque control when the temperature of the refrigerant discharged from the compressor 31 is likely to become excessively high, the device controller 52 can control the pressure reducing mechanism 34, the outdoor fan 37, the electronic valve for injection 83, the intermediate injection open/close valve 86 and/or the intake injection open/close valve 88 (the exemplary devices that make up the refrigerant circuit 20), to thereby place the refrigerant sucked into the compressor 31 in a wet vapor state or inject intermediate-pressure refrigerant into the refrigerant undergoing compression in the compressor 31. By placing the refrigerant sucked into the compressor 31 in a wet vapor state or injecting the intermediate-pressure refrigerant in the refrigerant circuit 20 into the refrigerant undergoing compression in the compressor 31, the temperature of the refrigerant discharged from the compressor 31 can be lowered and it is possible to reduce the possibility that the temperature of refrigerant becomes excessively high even when torque of the compressor 31, which includes the motor 31*a*, is controlled.

(5-2)

As described above, by choosing any one of the condensation temperature condition, the high-pressure condition, the pressure difference condition and the outside temperature condition as the predetermined condition for the determination by the control device 50 of the refrigeration apparatus 10, the control device 50 can easily determine whether or not the predetermined condition is satisfied and the device controller 52 of the control device 50 can more easily perform control.

(5-3)

The refrigerant sucked into the compressor 31 is placed in a wet vapor state by controlling the change in the degree of pressure reduction by the pressure reducing mechanism 34 and/or the amount of air sent by the outdoor fan 37. In other words, the pressure reducing mechanism 34 and/or the outdoor fan 37, which is/are commonly used devices in the refrigerant circuit 20, can be used to lower the temperature of the refrigerant discharged from the compressor 31 under a condition that the operation frequency is within the range of from 10 Hz to 40 Hz, torque of the motor 31*a* is controlled and, for example, the condensation temperature is 45° C. or higher (example of predetermined condition). In this way, there is no need to provide the refrigerant circuit 20 with a new device for preventing the temperature of the refrigerant from becoming excessively high when torque of the compressor 31 is controlled, and an increase in costs incurred for preventing the temperature of refrigerant from becoming excessively high when torque of the compressor 31 is controlled can be reduced.

(5-4)

In the above-described refrigeration apparatus 10, the refrigerant sucked into the compressor can be placed in a wet vapor state if the temperature of refrigerant discharged from the compressor 31 matches the target discharge temperature TTd, and hence the devices only need to be controlled while monitoring the temperature of the refrigerant discharged from the compressor 31. Further, it is easier to perform control using the device controller 52 for placing the refrigerant sucked into the compressor 31 in a wet vapor state during torque control.

(5-5)

In the refrigerant circuit 20 through which a refrigerant containing more than 50 wt. % of R32 flows, the refrigerant is more likely to have a high temperature and high pressure because the refrigerant contains more than 50 wt. % of R32, but in the above-described refrigeration apparatus 10, even when refrigerant is subject to heat generated by the motor 31*a* due to torque control, it is possible to reduce the possibility that the temperature of refrigerant becomes excessively high and torque of the motor 31*a* in the compressor 31 can be controlled more easily. Using an HFC refrigerant that contains more than 50 wt. % of R32 in the refrigerant circuit 20 contributes less to global warming and breaking down the ozone layer compared to other fluorocarbon refrigerants, and further achieves relatively high efficiency in the refrigeration apparatus 10.

REFERENCE SIGNS LIST

10 refrigeration apparatus
20 refrigerant circuit
31 compressor
31*a* motor
34 pressure reducing mechanism
37 outdoor fan
50 control device
51 inverter controller
52 device controller
83 electronic valve for injection
86 intermediate injection open/close valve
88 intake injection open/close valve

CITATION LIST

Patent Literature

[Patent Literature] JP H06-311778A

The invention claimed is:

1. A refrigeration apparatus comprising:
   a compressor that has a built-in motor having rotation thereof controlled by inverter control, the compressor being configured to compress refrigerant that flows through a refrigerant circuit;
   an inverter controller that controls torque of the motor through the inverter control when operation frequency of the compressor is at least one value within a range of from 10 Hz to 40 Hz; and
   a device controller that controls devices provided in the refrigerant circuit, such that,
      when at least the operation frequency is within the range of from 10 Hz to 40 Hz, torque of the motor is controlled, and when it is determined that at least one predetermined condition is satisfied, the device controller changes the control of the devices provided in the refrigerant circuit from a first mode providing that refrigerant sucked into the compressor is placed in a dry vapor state to a second mode providing that refrigerant sucked into the compressor is placed in a wet vapor state, wherein
   the at least one predetermined condition includes at least one condition selected from among:
      a condensation temperature condition in which a condensation temperature of the refrigerant circuit is 45° C. or higher,
      a high-pressure condition in which pressure on a high-pressure side of the refrigerant circuit is a predetermined pressure or more,
      a pressure difference condition in which a difference in pressure between the high-pressure side and a low-pressure side of the refrigerant circuit is a predetermined difference or more, and
      an outside temperature condition in which temperature of outside air that is heat exchanged with refrigerant that flows through the refrigerant circuit is a predetermined temperature or more.

2. The refrigeration apparatus according to claim 1, further comprising:

a pressure reducing mechanism provided in the refrigerant circuit as one of the devices for reducing pressure of the refrigerant that flows through the refrigerant circuit; and an outdoor fan that is provided in the refrigerant circuit as one of the devices for supplying the outside air to be heat exchanged with the refrigerant flowing through the refrigerant circuit, the outdoor fan being configured to be able to change an amount of air sent, wherein, when at least the operation frequency is within the range of from 10 Hz to 40 Hz, torque of the motor is controlled, and under the predetermined condition, the device controller changes a degree of pressure reduction by the pressure reducing mechanism or controls the amount of air sent by the outdoor fan, to thereby place the refrigerant sucked into the compressor in a wet vapor state.

3. The refrigeration apparatus according to claim 2, wherein, when at least the operation frequency is within the range of from 10 Hz to 40 Hz, torque of the motor is controlled, and under the predetermined condition, the device controller controls the devices such that temperature of the refrigerant discharged from the compressor matches a target discharge temperature, to thereby place the refrigerant sucked into the compressor in a wet vapor state.

4. The refrigeration apparatus according to claim 2, wherein the refrigerant that flows through the refrigerant circuit is a refrigerant that contains more than 50 wt. % of R32.

5. The refrigeration apparatus according to claim 1, wherein, when at least the operation frequency is within the range of from 10 Hz to 40 Hz, torque of the motor is controlled, and under the predetermined condition, the device controller controls the devices such that temperature of the refrigerant discharged from the compressor matches a target discharge temperature, to thereby place the refrigerant sucked into the compressor in a wet vapor state.

6. The refrigeration apparatus according to claim 5, wherein the refrigerant that flows through the refrigerant circuit is a refrigerant that contains more than 50 wt. % of R32.

7. The refrigeration apparatus according to claim 1, wherein the refrigerant that flows through the refrigerant circuit is a refrigerant that contains more than 50 wt. % of R32.

8. The refrigeration apparatus according to claim 1, wherein the compressor is a rotary compressor.

9. A refrigeration apparatus comprising:

a compressor that has a built-in motor having rotation thereof controlled by inverter control, the compressor being configured to compress refrigerant that flows through a refrigerant circuit;

an inverter controller that controls torque of the motor through the inverter control when operation frequency of the compressor is at least one value within a range of from 10 Hz to 40 Hz; and a device controller that controls devices provided in the refrigerant circuit such that, when at least the operation frequency is within the range of from 10 Hz to 40 Hz, torque of the motor is controlled, and it is determined that at least one predetermined condition is satisfied, the device controller changes the control of the devices provided in the refrigerant circuit from a first mode providing that intermediate-pressure refrigerant within the refrigerant circuit is not injected into the refrigerant undergoing compression in the compressor to a second mode providing that intermediate-pressure refrigerant within the refrigerant circuit is injected into refrigerant undergoing compression in the compressor, wherein the at least one predetermined condition includes at least one condition selected from among: a condensation temperature condition in which a condensation temperature of the refrigerant circuit is 45° C. or higher, a high-pressure condition in which pressure on a high-pressure side of the refrigerant circuit is a predetermined pressure or more, a pressure difference condition in which a difference in pressure between the high-pressure side and a low-pressure side of the refrigerant circuit is a predetermined difference or more, and an outside temperature condition in which temperature of outside air that is heat exchanged with refrigerant that flows through the refrigerant circuit is a predetermined temperature or more.

10. The refrigeration apparatus according to claim 9, wherein the compressor is a rotary compressor.

11. The refrigeration apparatus according to claim 9, further comprising:

a pressure reducing mechanism provided in the refrigerant circuit as one of the devices for reducing pressure of the refrigerant that flows through the refrigerant circuit; and an outdoor fan that is provided in the refrigerant circuit as one of the devices for supplying the outside air to be heat exchanged with the refrigerant flowing through the refrigerant circuit, the outdoor fan being configured to be able to change an amount of air sent, wherein, when at least the operation frequency is within the range of from 10 Hz to 40 Hz, torque of the motor is controlled, and under the predetermined condition, the device controller changes a degree of pressure reduction by the pressure reducing mechanism or controls the amount of air sent by the outdoor fan, to thereby place the refrigerant sucked into the compressor in a wet vapor state.

12. The refrigeration apparatus according to claim 9, wherein, when at least the operation frequency is within the range of from 10 Hz to 40 Hz, torque of the motor is controlled, and under the predetermined condition, the device controller controls the devices such that temperature of the refrigerant discharged from the compressor matches a target discharge temperature, to thereby place the refrigerant sucked into the compressor in a wet vapor state.

13. The refrigeration apparatus according to claim 9, wherein the refrigerant that flows through the refrigerant circuit is a refrigerant that contains more than 50 wt. % of R32.

* * * * *

UNITED STATES PATENT AND TRADEMARK OFFICE
CERTIFICATE OF CORRECTION

PATENT NO. : 11,280,525 B2
APPLICATION NO. : 17/012868
DATED : March 22, 2022
INVENTOR(S) : Tomoyuki Haikawa et al.

It is certified that error appears in the above-identified patent and that said Letters Patent is hereby corrected as shown below:

On the Title Page

Please include Item (30) the following Foreign Application Priority Data:
--(30) Foreign Application Priority Data
Apr. 1, 2016  (JP) ................. 2016-074497--.

Signed and Sealed this
Twenty-fifth Day of October, 2022

Katherine Kelly Vidal
*Director of the United States Patent and Trademark Office*